United States Patent [19]

Van Dongen

[11] Patent Number: 4,784,412

[45] Date of Patent: Nov. 15, 1988

[54] MOLDED FLUID CONDUIT FITTING WITH INTEGRAL SWIVEL NUT

[75] Inventor: John A. Van Dongen, Kent, Wash.

[73] Assignee: Red Dot Corporation, Seattle, Wash.

[21] Appl. No.: 97,844

[22] Filed: Sep. 16, 1987

[51] Int. Cl.$^4$ .............................................. F16L 25/00
[52] U.S. Cl. ...................................... 285/387; 285/156; 285/921; 411/433
[58] Field of Search ............... 285/387, 373, 419, 921, 285/156; 411/433, 432

[56] References Cited

U.S. PATENT DOCUMENTS

| | | | |
|---|---|---|---|
| 609,509 | 8/1898 | Jensen | 411/433 X |
| 625,448 | 5/1899 | Jaenichen | 411/432 X |
| 1,082,993 | 12/1913 | Beattie | 411/433 |
| 1,792,329 | 2/1931 | Smith | 411/433 |
| 3,689,110 | 9/1972 | Ferguson | 285/387 X |
| 3,771,820 | 11/1973 | Hoss, Sr. et al. | 285/373 |
| 4,226,164 | 10/1980 | Carter | 85/33 |
| 4,258,944 | 3/1981 | Wendel | 285/342 |
| 4,343,496 | 8/1982 | Petranto | 285/39 |
| 4,506,918 | 3/1985 | Friedrich et al. | 285/156 |
| 4,556,352 | 12/1985 | Resnilow | 411/433 |

FOREIGN PATENT DOCUMENTS

| | | | |
|---|---|---|---|
| 2718915 | 11/1978 | Fed. Rep. of Germany | 411/433 |
| 3344240 | 6/1984 | Fed. Rep. of Germany | 411/432 |
| 898139 | 4/1985 | France | 411/432 |

*Primary Examiner*—Dave W. Arola
*Attorney, Agent, or Firm*—Joan H. Pauly

[57] ABSTRACT

A T-block fitting (22) has an integral molded plastic body (24) including a stem (28) with a radial shoulder (26) and a radial flange (30) on opposite ends. An externally threaded split nut (40, 42) has a major portion (40) with a circumferential extent greater than 180°, and a minor portion (42). Complementary chordal mating surfaces (46, 62) are formed on the major and minor portions (40, 42). A semicylindrical projection (64) extends perpendicularly from each mating surface (62) and is received into a corresponding recess (48) in the abutting mating surface (46). A slot (50) extends along each mating surface (46) on the head portion (54) of the major portion (40). The slot (50) opens onto an outer surface of the head portion (54) and terminates in an inner enlarged diameter portion (52). A corresponding projection (66) with an enlarged inner end (68) is formed on each mating surface (62). The nut portions (40, 42) are made from a material which is sufficiently resilient to permit the major portion (40) to be snapped onto a tubular member and the major and minor portions (40, 42) to be snapped together.

12 Claims, 4 Drawing Sheets

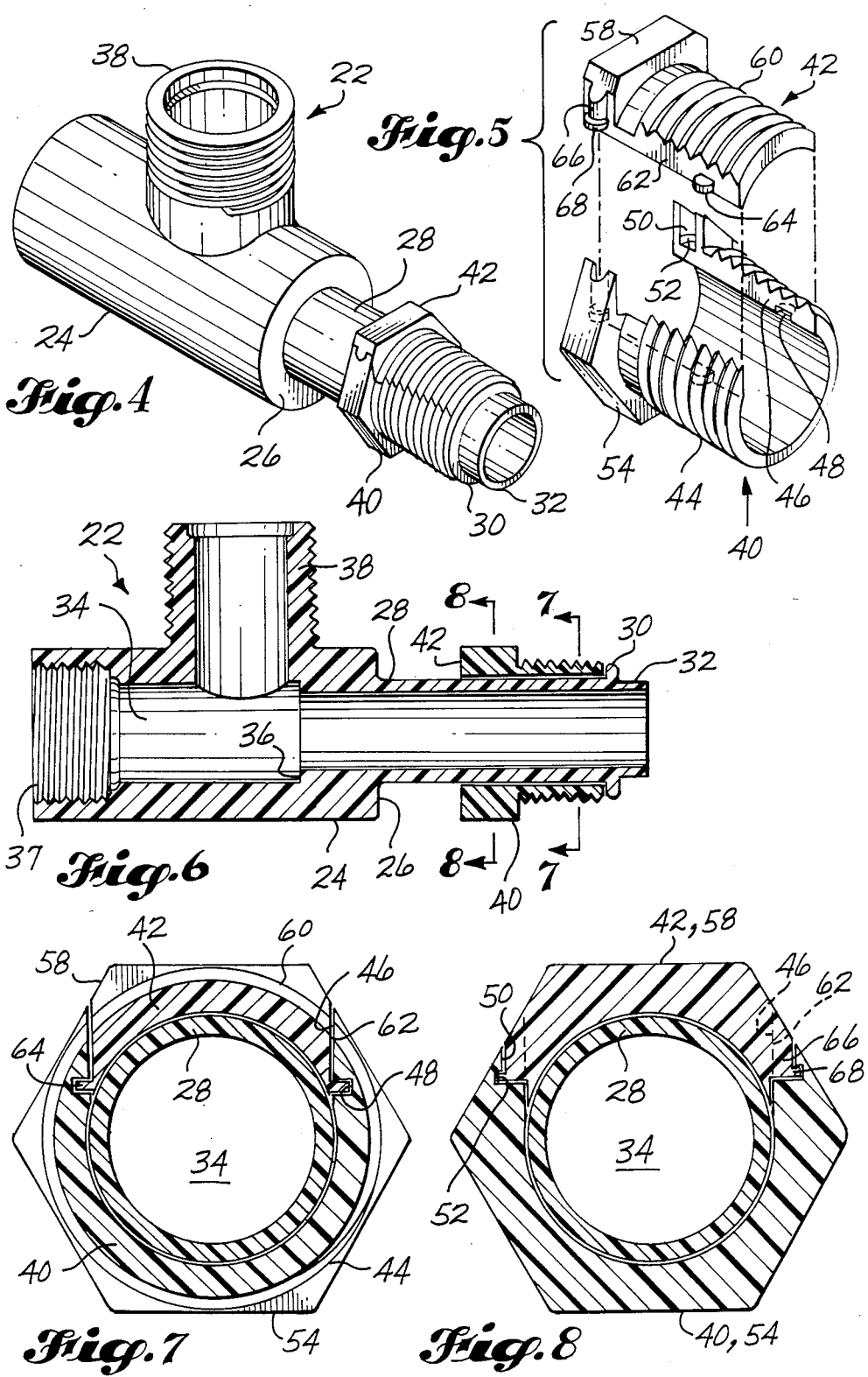

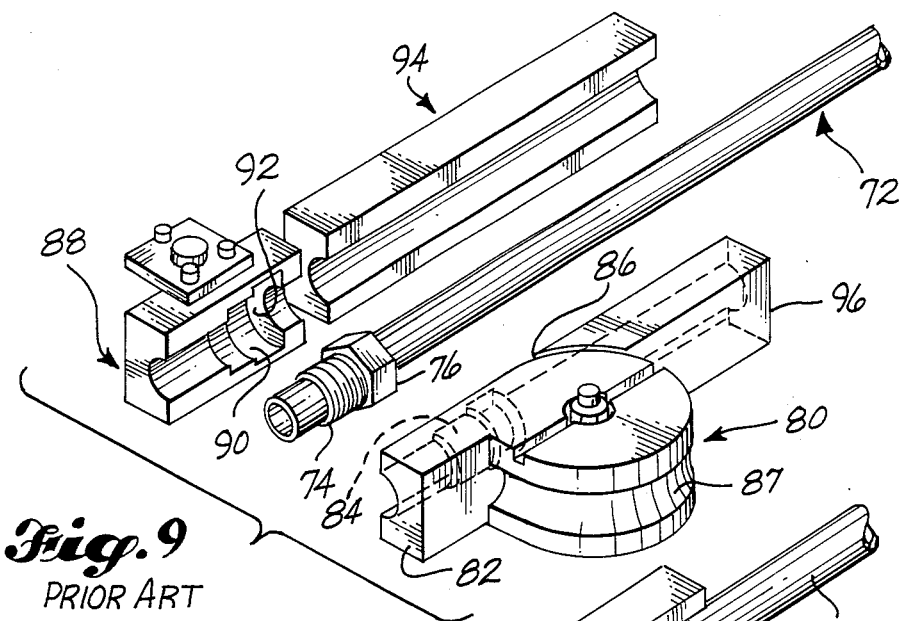
Fig. 9 PRIOR ART
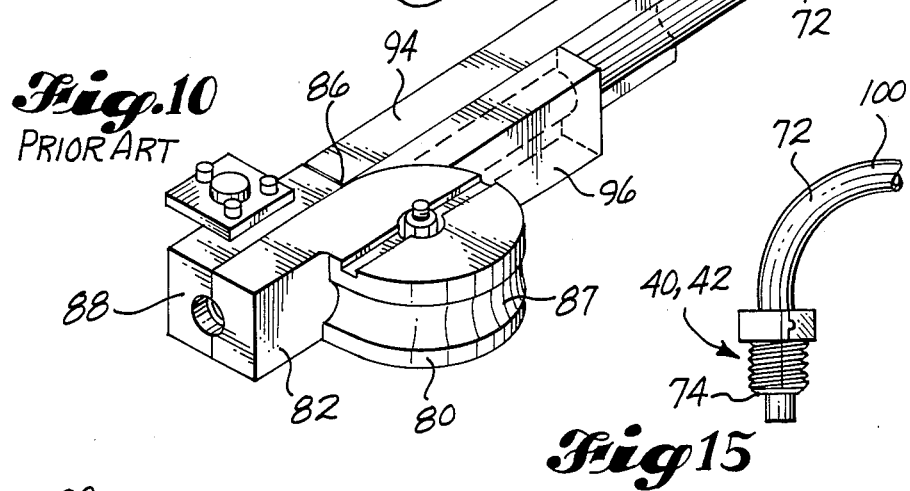
Fig. 10 PRIOR ART
Fig 15
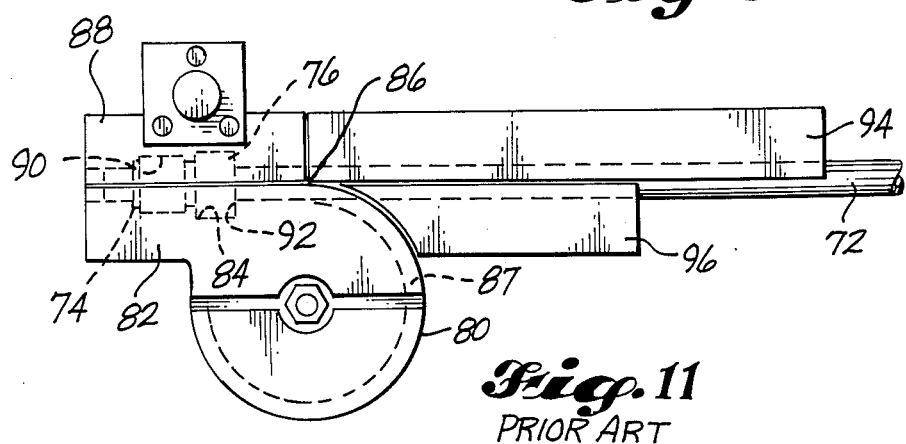
Fig. 11 PRIOR ART

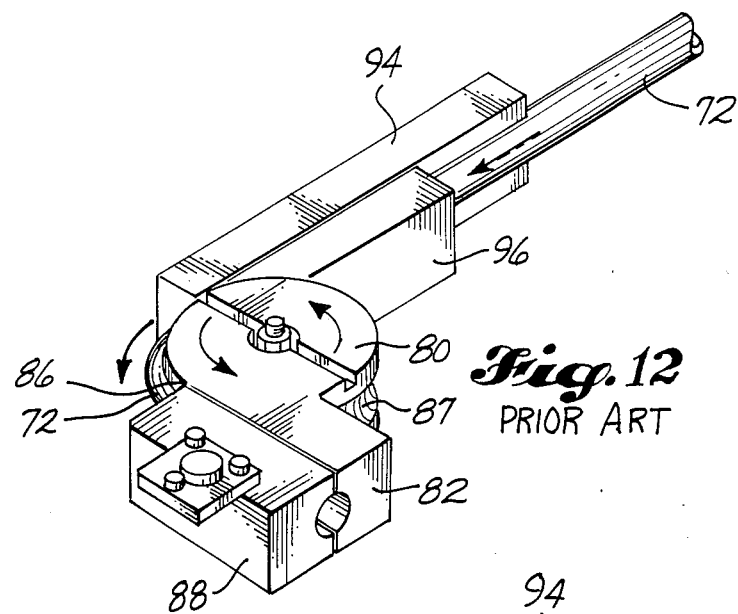
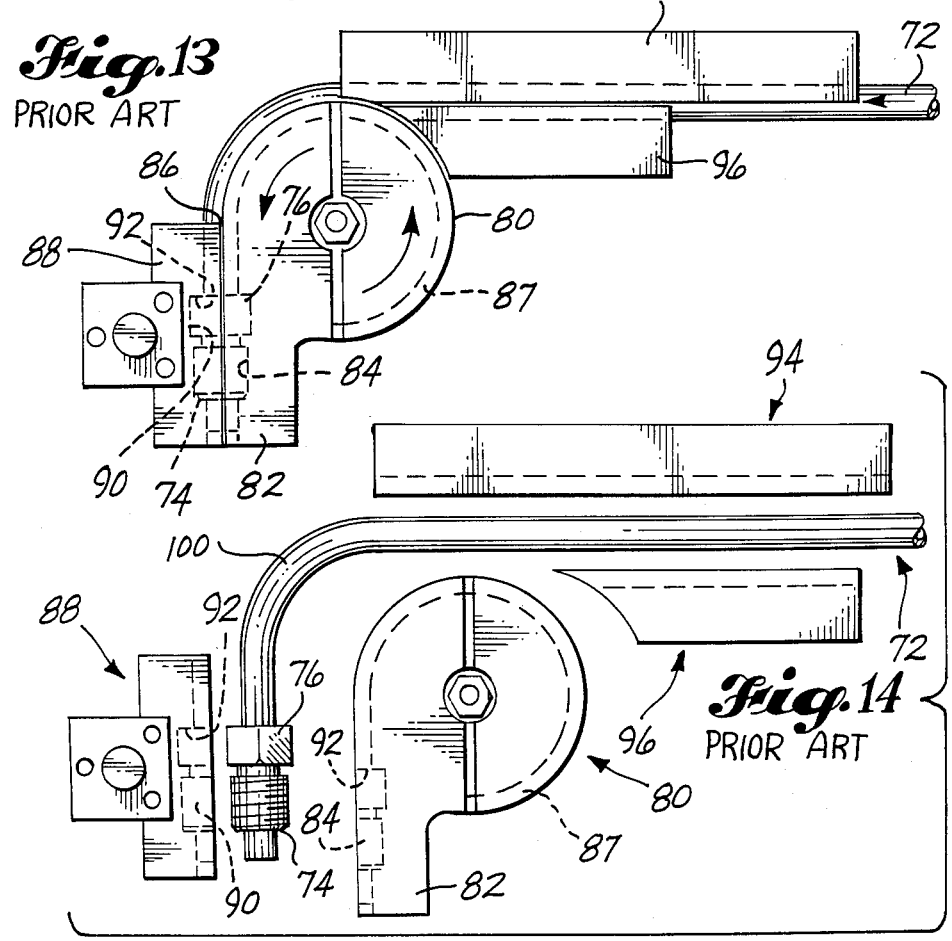

MOLDED FLUID CONDUIT FITTING WITH INTEGRAL SWIVEL NUT

DESCRIPTION

1. Technical Field

This invention relates to fluid conduit fittings and, more particularly, to such a fitting that has an integral molded plastic body including a stem with a radial shoulder and an opposite radial flange, and an externally threaded swivel nut with a major portion that snaps onto the stem between the shoulder and the flange, a minor portion, and snap fit keying means for aligning the threads on the major and minor portions when they are snapped together.

2. Background Art

In fluid conduit systems, such as those found in the air conditioning and heating systems of trucks, various types of fittings are used to connect the adjacent ends of conduits. One type of fitting that is commonly used is a T-block which may be screwed onto the end of one conduit and then attached to the end of another conduit without subjecting either conduit to rotational or translational movement. The second connection is accomplished by means of an externally threaded swivel nut that is positioned on a stem portion of the fitting between an outwardly extending radial shoulder and an outwardly extending radial flange. The nut is rotatable and axially slidable relative to the stem so that it may be threadedly connected to the second conduit without any appreciable change in the conduit's position.

This type of T-block fitting is presently made from metal. The stem with the flange formed thereon is made separately from the main body of the fitting. When the stem is attached to the body, the end surface of the body forms the shoulder. The nut is positioned on the stem before it is attached to the body. This method of manufacture provides the desired relationship between the nut and the stem, shoulder, and flange. However, the cost of manufacture is relatively high.

Another kind of common connection found in fluid conduit systems of the type found in the air conditioning and heating systems of trucks is one in which a conduit with a swivel nut positioned between an end flange and a bend in the conduit is attached to a fitting or another conduit by means of the nut. It is frequently desirable to minimize the distance between the bend in the conduit and the end of the conduit since the conduit must fit into a limited amount of space and/or projects outwardly from a wall before bending to be parallel to the wall. It is of course desirable to minimize the distance between the wall and the parallel portion of the conduit.

A problem arises in manufacturing bent conduits for this type of installation. A bend very close to the end of the conduit generally cannot be accomplished using standard tooling. Standard tooling for forming bends in metal conduits includes a split block which holds the tube end and a bend die for forming the bend. The split block either does not have room to accommodate the swivel nut and form a bend close to the end of the conduit or cannot form the bend as close as may be required. Therefore, standard procedures using standard tooling cannot be used to form the bend and alternative procedures must be followed. Such alternative procedures tend to be time consuming and considerably more expensive than standard procedures. Another problem that arises in connection with the use of bent conduits with swivel nuts is that the nuts tend to become damaged during handling prior to the assembly of the fluid system. When this happens, the entire conduit/nut assembly must be discarded.

Split nuts or nut-like components for connecting the ends of conduits are disclosed in U.S. Pat. No. 4,226,164, granted Oct. 7, 1980, to A. L. Carter; U.S. Pat. No. 4,258,944, granted Mar. 31, 1981, to I. L. Wendel; and U.S. Pat. No. 4,343,496, granted Aug. 10, 1982, to J. J. Petranto. Each of these patents addresses the problem of removing and replacing the nut when it cannot be slide onto the axial end of the conduit because of bends or obstructions on the conduit. The split nut disclosed by each patent permits removal and replacement of the nut without dismantling the conduit system or cutting conduit sections.

Carter discloses an internally threaded coupling nut for use in plumbing. The nut has substantially equal halves with arc ends that carry interlocking lugs. The halves are slid together axially. Projections on the lugs carried by one half snap fit into grooves in the lugs carried by the other half to prevent further relative axial shifting.

Wendel discloses an internally threaded split slip nut for a plumbing trap joint. The nut is split into halves which have radially projecting lugs that are secured together to secure the halves together. The lugs are keyed together by means of a pin and recess arrangement.

Petranto discloses an externally threaded nut-like split gland for attaching conduits or tubing in various vehicle systems. The gland comprises two "essentially mirror image" half glands. The half glands are secured together by means of a separate horseshoe-shaped key or retainer that fits into internal slots in the halves and a spring clip that extends around the outer surface of a shoulder carried by the halves.

U.S. Pat. No. 3,771,820, granted Nov. 13, 1973, to W. A. Hoss, Sr., et al., discloses a split sleeve for permanently coupling conduits, such as hydraulic lines, and for repairing leaks and damaged portions of conduits. The sleeve is split into substantially identical halves which have complementary flat confronting faces that slide radially together. The sleeve halves are adhesively secured to the conduit being repaired or the conduits being joined.

U.S. Pat. No. 4,506,918, granted Mar. 26, 1985, to R. S. Friedrich et al., discloses a method of manufacturing a fiber reinforced plastic pipe tee. In the method, the tee is formed by winding glass rovings in a pattern designed to avoid stress patterns that are tolerable by more ductile materials, such as metal, but are intolerable for the relatively brittle reinforced plastic.

The above patents and the prior art that is discussed and/or cited therein should be studied for the purpose of putting the present invention in proper perspective relative to the prior art.

DISCLOSURE OF THE INVENTION

A subject of the invention is an improved fitting for use in a fluid conduit system. The fitting is of the type having a stem, a shoulder extending radially outwardly from a first end portion of the stem, a flange extending radially outwardly from a second opposite end portion of the stem, and an externally threaded nut rotatably surrounding the stem between the shoulder and the flange. According to an aspect of the invention, the improvement comprises an integral molded plastic fitting body that includes the stem, the shoulder, and the flange. The nut comprises a major portion and a minor portion. The major portion has a circumferential extent greater than 180° and an outer circumferential surface with coextensive external threads. The minor portion has a circumferential extent less than 180° and an outer circumferential surface with coextensive external threads. Complementary mating surfaces are carried by the major portion and the minor portion. Snap fit keying means is carried by the mating surfaces for aligning the threads on the major and minor portions when the major and minor portions are moved together. The major and minor portions are made from a material that is sufficiently resilient to permit the major portion to be snapped onto the stem and the major and minor portions to be snapped together. The preferred circumferential extent of the major portion is about 235°. The preferred circumferential extent is small enough to allow the major portion to be easily snapped onto the stem but large enough to securely attach the major portion to the stem.

The keying means may be provided in a variety of forms. Preferably, the keying means comprises first and second pairs of projections carried by the mating surfaces. The pairs are axially spaced from each other. Corresponding recesses are formed in the mating surfaces for receiving the pairs of projections. Another preferred feature of the keying means is a slot that extends along one of the mating surfaces and opens onto an outer surface of one of the major and minor portions. The slot has an enlarged diameter inner portion. A corresponding projection on the other of the major and minor portions has an enlarged inner portion which is positioned and dimensioned to snap into the enlarged diameter inner portion of the slot. Preferably, a pair of such slots and corresponding projections are provided, and the slots extend along chord surfaces that are substantially tangent to the stem of the fitting and substantially parallel to each other. Also preferably, the chord surfaces are carried by head portions of the major and minor portions.

Another subject of the invention is the nut described above for use in a fluid conduit system having an axially inaccessible tubular portion. The major portion of the nut snaps onto the tubular portion. In the preferred embodiment, the chord surfaces which carry the slots of the keying means are substantially tangent to the tubular portion.

The improved fitting of the invention solves the problem discussed above of the relatively high cost of manufacture of fittings of the type having a stem with a radial shoulder and an opposite radial flange and a nut rotatable surrounding the stem between the shoulder and the flange. The invention makes it possible to form the fitting body, including the stem, the shoulder, and the flange, as a single integral molded plastic piece. This greatly reduces the cost of manufacturing the fitting body. The split nut of the invention is positioned on the fitting body after the body is formed.

The use of the nut of the invention also solves the problems discussed above relating to conduits having bends close to flanged ends. The bend in a conduit of this type may be formed, before the nut is positioned on the conduit, using standard tooling. The use of standard tooling and the accompanying standard procedures reduces the cost of manufacture. The nut is preferably positioned on the conduit when the conduit/nut assembly is incorporated into a fluid system. The delayed assembling of the nut and conduit helps prevent damage to the nut during handling of the components of the system.

The structure of the nut is relatively simple and readily lends itself to inexpensive manufacture, such as by forming the major and minor portions of the nut from molded plastic. The splitting of the nut into a major portion and a minor portion provides a more secure connection between the nut and the stem or other tubular portion without complicating the structure of the nut. In addition, the nut may easily be installed onto a stem or other tubular portion with one hand. This greatly facilitates installation of the nut when there is limited working space around the installation location.

The preferred form of the snap fit keying means further contributes to the secure positioning of the nut on the stem or other tubular portion. The axial spacing of pairs of projections provides a secure, multi-point connection and helps to compensate for minor irregularities in the mating surfaces. This in turn permits the use of wider tolerances in the manufacture of the nut portions to help reduce the cost of manufacture of the nut. The slot configuration of the preferred embodiment of the keying means assists the proper aligning of the major and minor portions when they are being snapped together, assists in maintaining the portions in correct alignment, and relieves axial loads on the other portions of the keying means.

These and other advantages and features will become apparent from the detailed description of the best mode for carrying out the invention that follows.

BRIEF DESCRIPTION OF THE DRAWINGS

In the drawings, like element designations refer to like parts throughout, and:

FIG. 4 is a pictorial view of the preferred embodiment of the fitting of the invention.

FIG. 5 is an exploded pictorial view of the preferred embodiment of the nut shown in FIG. 4.

FIG. 6 is a sectional view of the fitting shown in FIG. 4.

FIG. 7 is a sectional view taken along the line 7—7 in FIG. 6.

FIG. 8 is a sectional view taken along the line 8—8 in FIG. 6.

FIG. 9 is an exploded pictorial view of a fluid conduit and conventional tooling for bending the conduit.

FIG. 10 is a pictorial view of the conduit and tooling shown in FIG. 9 in a closed position ready for the bending operation.

FIG. 11 is a top plan view of the conduit and tooling shown in FIG. 10.

FIG. 12 is like FIG. 10 except that it shows the end of the bending operation.

FIG. 13 is a top plan view of the conduit and tooling shown in FIG. 12.

FIG. 14 is an exploded top plan view of the tooling and conduit shown in FIGS. 9–13 following the bending operation.

FIG. 15 is a top plan view of a bent conduit and the preferred embodiment of the nut of the invention.

BEST MODE FOR CARRYING OUT THE INVENTION

FIGS. 4-8 show a nut 40, 42 and a fitting 22 into which the nut 40, 42 is incorporated that are constructed according to the invention and that also constitute the best mode for carrying out the invention currently known to the applicant. The fitting 22 shown in FIGS. 4-8 is a T-block fitting of a type used in fluid conduit systems such as those found in the air conditioning and heating systems of trucks. FIGS. 9-15 illustrate the forming of a bent conduit and the positioning of a swivel nut on the conduit. It is anticipated that the primary application of the improvement of the invention will be in fittings of the type shown in FIGS. 4-8 and that the primary uses of the nut of the invention will be in connection with such fittings and the type of bent conduit shown in FIGS. 14 and 15. However, it is of course to be understood that the improvement of the invention may also be incorporated to advantage into other types of fittings and that the nut of the invention may advantageously be used on other portions of fluid conduit systems, including various types of systems for conducting gases and/or liquids.

Figure 1:
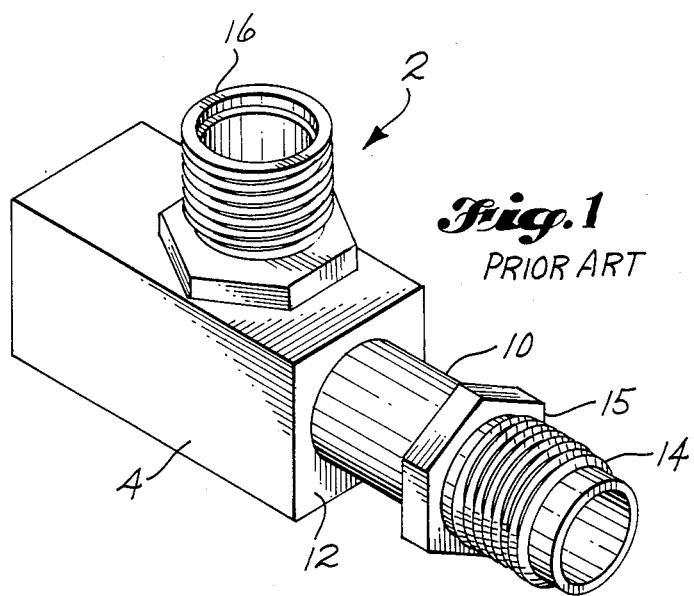
FIG. 1 is a pictorial view of a known metal fitting.
Figure 2:
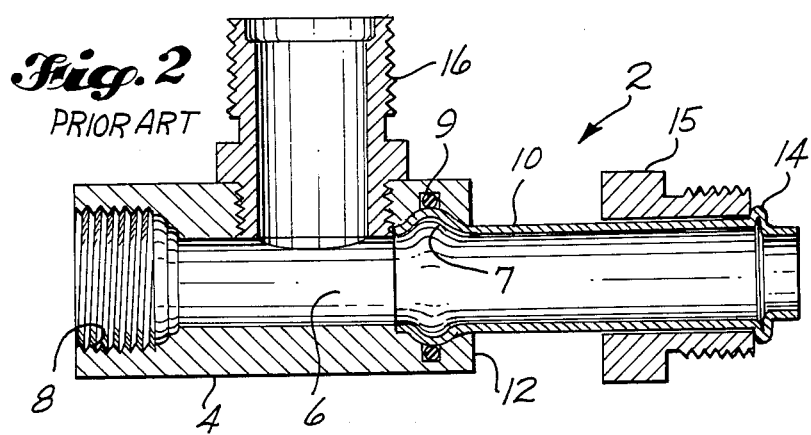
FIG. 2 is a sectional view of the fitting shown in FIG. 1.
Figure 3:
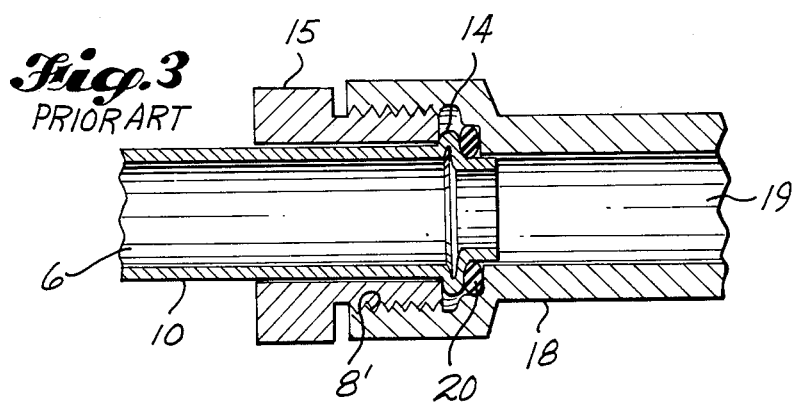
FIG. 3 is an enlarged sectional view of the outer portion of the stem and the nut shown in FIGS. 1 and 2 threadedly connected to a conduit end.

A conventional T-block fitting 2 is shown in FIGS. 1-3. The fitting 2 is illustrated and described herein for the purpose of illustrating a major problem which the apparatus of the invention solves. The fitting 2 includes a main rectangular block 4 through which an axial passageway 6 extends. One end 8 of the passageway 6 is enlarged and has internal threads. The inner diameter of the passageway end 8 is standardized for threadedly receiving an externally threaded member of a standard size. The fitting 2 also includes a stem 10 and a tubular branch 16, which are manufactured separately from the main block 4 and then attached to the block 4. The end of the passageway 6 in the block 4 opposite the threaded end 8 is enlarged, as shown in FIG. 2, for receiving the inner end of the stem 10 to attach the stem 10 to the block 4. The axial passageway through the stem 10 forms a continuation of the passageway 6. The passageway 6 has an annular recess 7 which receives an O-ring 9. After the end of the stem 10 is positioned in the passageway 6, it is expanded into the recess 7, as shown in FIG. 2, to seal against the O-ring 9. The tubular branch 16 is threadedly connected to an opening formed in the block 4 and is oriented so that the passageway through the branch 16 is perpendicular to and communicates with the passageway 6.

The stem 10 has a radially outwardly extending flange 14 formed thereon near its outer end. The flange 14 is formed on the stem 10 and an externally threaded nut 15 is positioned on the stem 10 before the stem 10 is secured to the block 4. The nut 15 is rotatable and axially slidable relative to the stem 10. The end 12 of the block 4 that faces the nut 15 forms a shoulder 12 which limits the axial movement of the nut 15. As noted above, the separate forming of the stem 10 and the block 4 and the positioning of the nut 15 on the stem 10 before it is attached to the block 4 achieve the desired rotatable positioning of the nut on the stem 10 between the shoulder 12 and the flange 14, but the cost of manufacture of the fitting 2 is relatively high.

FIG. 3 illustrates the manner in which the stem end in the type of fitting shown in FIGS. 1 and 2 connects to the internally threaded end of a fluid conduit 18. The outer diameter of the threaded portion of the nut 15 is of a standard size to threadedly mate with an internally threaded conduit end 8' having an internal diameter equal to the diameter of the passageway end 8. As described above, since the nut 15 is rotatable and axial slidable relative to the stem 10, the fitting 2 may be attached to the end 8' of conduit 18 after the fitting end 8 has been connected to another conduit without any appreciable movement of such other conduit, the body of the fitting 2, or the conduit 18. With the outer end of the stem 10 already positioned in the conduit 18 the nut 15 is simply rotated to move it axially and tighten the connection between the stem 10 and the conduit 18. The outer end of the stem 10 outward of the flange 14 has a reduced diameter so that it may be received into the conduit passageway 19, which has the same inner diameter as the passageway 6 in the fitting 2. An O-ring 20 is positioned between the flange 14 and a shoulder formed at the junction between the enlarged end 8' of the conduit 18 and the main portion of the passageway 19. The tightening of the nut 15 compresses the O-ring 20 between the flange 14 and the shoulder to seal the connection between the stem 10 and the conduit 18.

FIGS. 4-8 show the preferred embodiment of the improvement of the invention. The fitting 22 of the preferred embodiment is of the same type as the known fitting 2 shown in FIGS. 1-3. However, instead of being made from metal components that are manufactured separately and then assembled together, the fitting 22 has an integral molded plastic body 24. The body 24 has a main portion which corresponds to the main block 4 of the fitting 2. The body 24 also includes a stem 28 and a branch 38 which are positioned in the same manner as the stem 10 and branch 16 of the known fitting 2. The fitting body 24, including its main portion, the stem 28, and the branch 38, are all formed together in a single integral piece in a single molding operation. The end of the main portion of the body 24 adjacent to the stem 28 forms a radial shoulder 26 relative to the stem 28. An annular radially outwardly extending flange 30 is integrally formed on the stem 28 near its outer end opposite the shoulder 26 during the molding operation.

Referring to FIG. 6, an axial passageway 34 extends through the fitting 22. The passageway 34 performs the same function as the passageway 6 through the known fitting 2 but differs in the details of its configuration. The passageway 34 has a threaded end 37 which has the same dimensions as the threaded end 8 of the fitting 2 for receiving standard size externally threaded members. The portion of the passageway 34 adjacent to the threaded end 37 has the same inner diameter as the main portion of the passageway 6 in the fitting 2 and the passageway 19 in the conduit 18. A step 36 is formed in the passageway 34 between the branch 38 and the stem 28 adjacent to the branch 38. The passageway 34 has a constant reduced inner diameter from the step 36 to the outer end of the stem 28.

The stem portion 28 of the integral body 24 has a constant inner diameter and a constant outer diameter between the shoulder 26 and the flange 30. Outwardly of the flange 30, the inner diameter remains the same but the annular sidewall of the stem 28 is reduced in thickness to provide a reduced outer diameter. The reduced outer diameter portion 32 of the stem 28 outward of the flange 30 is dimensioned so that the stem 28 may be received into a standard conduit 18 in the same manner as the stem 10 of the known fitting 2, as shown in FIG. 3. The details of the construction of the passageway 34 and the stem 28 facilitate the molding of the fitting body 24 without sacrificing either structural strength or the capability of the fitting 22 to connect together any conduit configuration which may be connected by the known fitting 2.

Since the fitting body 24, including the shoulder 26 and the flange 30, is molded in a single integral piece, a conventional nut like the nut 15 shown in FIGS. 1–3 cannot be positioned on the stem 28. Therefore, the improved fitting of the invention includes, as well as the integrally molded body 24, a split nut 40, 42 which may be positioned on the stem 28 after the forming of the body 24. The nut 40, 42 of the invention includes a major portion 40 and a minor portion 42, which are best seen in FIG. 5. Each of these portions 40, 42 has a shaft portion with an outer circumferential surface with co-extensive external threads 44, 60. Each portion 40, 42 also has a head portion 54, 58. When the major and minor portions 40, 42 are snapped together, they form a nut 40, 42 with the same external configuration as the conventional nut 15. The head 54, 58 of the nut 40, 42 is hexagonal to facilitate turning of the nut 40, 42, and the threads 44, 60 mate together to form continuous threads around the circumference of the shaft of the nut 40, 42.

The major portion 40 has a circumferential extent greater than 180°, and the minor portion 42 has a circumferential extent less than 180°. In the preferred embodiment, the circumferential extent of the major portion 40 is about 235°. This preferred dimensioning of the major and minor portions 40, 42 provides a secure connection and facilitates positioning of the nut 40, 42 on the stem 28 of the fitting 22 or on some other axially inaccessible tubular portion of a fluid conduit system, as described below.

The major and minor portions 40, 42 have complementary mating surfaces 46, 62 which abut each other when the major and minor portions 40, 42 have been snapped together. The mating surfaces 46, 62 carry snap fit keying means for aligning the threads 44, 60 and holding the major and minor portions 40, 42 together in an assembled position. Preferably the mating surfaces 46, 62 are chordal surfaces, and the mating surfaces are positioned and the keying means is shaped to allow the major and minor portions 40, 42 to be moved radially together. Radial assembly makes it possible to install the nut 40, 42 on a tubular member with a limited axial extent. For example, the stem 28 on the fitting 22 is longer than the nut 40, 42 but is not twice as long as the nut 40, 42. The major and minor portions 40, 42 are made from a material that is sufficiently resilient to permit the major portion 40 to be snapped onto a tubular member such as the stem 28 and the major and minor portions 40, 42 to be snapped together. Preferably, the portions 40, 42 are made from the same type of molded plastic that the fitting body 24 is made from.

The preferred embodiment of the snap fit keying means is best seen in FIGS. 5, 7, and 8. The keying means shown in the drawings includes first and second pairs of projections 64, 66 carried by the mating surfaces 62 of the minor portion 42 and corresponding recesses 48, 50 formed in the mating surfaces 46 of the major portion 40. The pairs of projections 64, 66 and recesses 48, 50 are axially spaced from each other. The projections 66 are formed on the mating surfaces 62 on the head portion 58 of the minor portion 42, and the projections 64 are formed on the mating surfaces 62 near the opposite axial end of the minor portion 42.

The projections 64 and recesses 48 are best seen in FIGS. 5 and 7. A projection 64 is formed on each mating surface 62 of the minor portion 42 inwardly of the threads 60. The projection 64 has essentially flat upper and lower surfaces that extend perpendicularly from the mating surface 62. The outer surface of the projection 64 has a semicylindrical configuration. The corresponding recess 48 on the mating surface 46 of the major portion 40 has a shape substantially the same as the shape of the projection 64 and opens onto the inner circumferential surface of the major portion 40. When the major and minor portions 40, 42 are moved radially together, the projections 64 snap into the recesses 48.

Referring to FIGS. 4, 5, and 8, the recesses 50 on the head portion 54 of the major portion 40 have a slot configuration. A substantially semicylindrical slot 50 extends along each of the mating surfaces 46. The slot 50 opens onto an outer surface of the head portion 54 and extends inwardly to terminate in an enlarged diameter inner portion 52. The corresponding projection 66 on the mating surface 62 is shaped and dimensioned to snap fit into the slot 50. The inner end 68 of the projection 66 is shaped similarly to the projection 64 and has an enlarged diameter to snap fit into the enlarged diameter inner portion 52 of the slot 50.

As can be seen in FIGS. 7 and 8, the chordal mating surfaces 46, 62 are preferably substantially parallel to each other and substantially tangent to the outer surface of the stem 28 or other tubular member on which the nut 40, 42 is positioned. When the major and minor portions 40, 42 are moved radially together, the portions 40, 42 flex an amount sufficient to allow the projections 64 to slide along the mating surfaces 46 and the enlarged diameter portions 68 of the projections 66 to slide along the slots 50 until the projections 64 snap into the recesses 48 and the enlarged portions 68 snap into the enlarged ends 52 of the slots 50. When this has been accomplished, the major and minor portions 40, 42 are securely connected to each other and to the stem 28 or other tubular member.

The procedure for installing the nut 40, 42 on a tubular member is as follows. The minor portion 42 is held in position on the tubular member. Then the major portion 40 is snapped onto the tubular member and into connected engagement with the minor portion 42. As the major portion 40 is being snapped onto the tubular member, the arcuate edges of the major portion 40 are forced apart to flex the major portion 40 an amount sufficient to allow it to be snapped onto the tubular member and the major and minor portions 40, 42 to be snapped together. This procedure for installing the nut 40, 42 allows the material from which the nut 40, 42 is made to be relatively rigid with only a small amount of flex so that the connection to the tubular member has maximized security.

The installation procedure may be modified for one-handed installation in situations in which there is limited access to the tubular member. In the modified procedure, the major portion 40 is first positioned on the tubular member so that it will remain on the tubular member by itself but is not snapped all the way onto the tubular member. Then the minor portion 42 is placed in position on the tubular member and held there with the thumb of one hand. While holding the minor portion 42 in position with the thumb, the installer snaps the major portion 40 all the way onto the tubular member and into engagement with the minor portion 42 with the fingers of the same hand.

FIGS. 9–14 illustrate the forming of a bend 100 in a conduit 72 using standard tooling. The conduit 72 is of the type having an outwardly extending radial flange 74 near its end. A swivel nut 76 of a known type is received onto the conduit 72 and is ultimately positioned between the flange 74 and the bend 100.

The tooling shown in FIGS. 9–14 comprises a bend die 80 having a clamp portion 82, a clamp die 88, a pressure die 94, and a wiper die 96. A recess 84 is formed in the clamp portion 82 of the bend die 80. This recess 84 cooperates with a recess 90 in the clamp die 88 to form an internal recess for receiving the flange 74 and nut 76 during the bending operation. At the start of the operation, the parts of the tooling are positioned together as shown in FIGS. 10 and 11. The clamp die 88 is clamped against the clamp portion 82 of the bend die 80 to hold the conduit 72 and nut 76 in position against the clamp portion 82 and prevent any slippage of the conduit 72 as the bend die 80 rotates. Then, the bend die 80 is rotated from the position shown in FIGS. 10 and 11 to the position shown in FIGS. 12 and 13 to form a bend in the conduit 72. The pressure die 94 forces the conduit 72 into the tube groove 87 in the bend die 80. The wiper die 96 supports the conduit 72 and prevents wrinkling of the conduit 72 behind the tangent point 86 (the point at which the bend starts).

The nut 76 shown in FIGS. 9–14 is of a conventional type which must be positioned on the conduit 72 before the bend 100 is formed in the conduit 72. As can be seen in FIGS. 11 and 13, the abutment of the top surface of the nut 76 against the radial shoulder 92 formed by the recess 84, 90 defines the minimum distance between the end of the conduit 72 and the tangent point 86 at which the bend begins. The relatively large magnitude of this distance is best seen in FIG. 14. By contrast, the use of the nut 40, 42 of the invention makes possible the relatively short distance between the end of the conduit 72 and the bend 100 illustrated in FIG. 15. When the nut 40, 42 of the invention is used, the flange 74 may be positioned in abutting engagement with the shoulder 92 to produce the desired shortening of the distance between the bend 100 and the end of the conduit 72.

Although the preferred embodiment of the invention has been illustrated and described herein, it is intended to be understood by those skilled in the art that various modifications and omissions in form and detail may be made without departing from the spirit and scope of the invention as defined by the following claims.

I claim:

1. For use in a fluid conduit system, an improved fitting of the type having a stem, a shoulder extending radially outwardly from a first end portion of the stem, a flange extending radially outwardly from a second opposite end portion of the stem, and an externally threaded nut rotatably surrounding the stem between the shoulder and the flange, wherein the improvement comprises:
   an integral molded plastic fitting body that includes the stem, the shoulder, and the flange; and
   said nut comprising a major portion having a circumferential extent greater than 180° and an outer circumferential surface with coextensive external threads, a minor portion having a circumferential extent less than 180° and an outer circumferential surface with coextensive external threads, complementary mating surfaces carried by said major portion and said minor portion, and snap fit keying means carried by said mating surfaces for aligning said threads on the major portion and the minor portion when said major and minor portions are moved together and for holding said major and minor portions together in an assembled position in which said threads on said major and minor portions are aligned; said major and minor portions being made from a material that is sufficiently resilient to permit the major portion to be snapped onto the stem and the major and minor portions to be snapped together.

2. The fitting of claim 1, in which the keying means comprises first and second pairs of projections carried by said mating surfaces, said pairs being axially spaced from each other; and corresponding recesses formed in said mating surfaces for receiving said pairs of projections.

3. The fitting of claim 1, in which the keying means comprises a slot extending along one of said mating surfaces and opening onto an outer surface of one of said major and minor portions, and slot having an enlarged diameter inner portion; and a corresponding projection on the other of said major and minor portions having an enlarged inner portion positioned and dimensioned to snap into said enlarged diameter inner portion of the slot.

4. The fitting of claim 3, in which the keying means comprises a pair of said slots and corresponding projections, each said slot extends along a mating surface that is a chord surface substantially tangent to said stem, and said chord surfaces are substantially parallel to each other.

5. The fitting of claim 4, in which each of said major and minor portions has a head portion, and said chord surfaces are carried by said head portions; and in which the keying means further comprises a second pair of projections carried by said mating surfaces axially spaced from said slots, and corresponding recesses formed in said mating surfaces for receiving said second pair of projections.

6. The fitting of claim 1, in which said circumferential extent of said major portion is about 235°.

7. For use in a fluid conduit system having an axially inaccessible tubular portion, a split nut comprising:
   a major portion having a circumferential extent greater than 180° and an outer circumferential surface with coextensive external threads;
   a minor portion having a circumferential extent less than 180° and an outer circumferential surface with coextensive external threads;
   complementary mating surfaces carried by said major portion and said minor portion; and
   snap fit keying means carried by said mating surfaces for aligning said threads on the major portion and the minor portion when said major and minor portions are moved together and for holding said major and minor portions together in an assembled position in which said threads on said major and minor portions are aligned;
   said major and minor portions being made from a material that is sufficiently resilient to permit the major portion to be snapped onto said tubular portion and the major and minor portions to be snapped together.

8. The nut of claim 7, in which the keying means comprises first and second pairs of projections carried by said mating surfaces, said pairs being axially spaced from each other; and corresponding recesses formed in said mating surfaces for receiving said pairs of projections.

9. The nut of claim 7, in which the keying means comprises a slot extending along one of said mating surfaces and opening onto an outer surface of one of said major and minor portions, said slot having an enlarged diameter inner portion; and a corresponding projection on the other of said major and minor portions having an enlarged inner portion positioned and dimensioned to snap into said enlarged diameter inner portion of the slot.

10. The nut of claim 9, in which the keying means comprises a pair of said slots and corresponding projections, each said slot extends along a mating surface that is a chord surface substantially tangent to said tubular portion, and said chord surfaces are substantially parallel to each other.

11. The nut of claim 10, in which each of said major and minor portions has a head portion, and said chord surfaces are carried by said head portions; and in which the keying means further comprises a second pair of projections carried by said mating surfaces axially spaced from said slots, and corresponding recesses formed in said mating surfaces for receiving said second pair of projections.

12. The nut of claim 7, in which said circumferential extent of said major portion is about 235°.

* * * * *

UNITED STATES PATENT AND TRADEMARK OFFICE
CERTIFICATE OF CORRECTION

PATENT NO. : 4,784,412

DATED : November 15, 1988

INVENTOR(S) : John A. Van Dongen

It is certified that error appears in the above-identified patent and that said Letters Patent is hereby corrected as shown below:

Column 2, line 12, "slide" should be -- slid --.

The fourth line of claim 3, column 10, "and", second occurrence, should be -- said --.

Signed and Sealed this

Second Day of May, 1989

Attest:

DONALD J. QUIGG

*Attesting Officer*    *Commissioner of Patents and Trademarks*